United States Patent
Vargantwar et al.

(10) Patent No.: US 8,045,526 B2
(45) Date of Patent: *Oct. 25, 2011

(54) METHOD FOR USE OF AZIMUTH AND BEARING DATA TO SELECT A SERVING SECTOR FOR A MOBILE STATION

(75) Inventors: Sachin R. Vargantwar, Overland Park, KS (US); Ashvini G. Canjeevaram, Burlington, MA (US); Manoj Shetty, Overland Park, KS (US); Siddharth S. Oroskar, Overland Park, KS (US); DeveshKumar N. Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/951,736

(22) Filed: Nov. 22, 2010

(65) Prior Publication Data

US 2011/0065439 A1    Mar. 17, 2011

Related U.S. Application Data

(63) Continuation of application No. 11/831,373, filed on Jul. 31, 2007, now Pat. No. 7,881,263.

(51) Int. Cl.
*H04W 4/00* (2009.01)

(52) U.S. Cl. .................... 370/331; 455/456.1
(58) Field of Classification Search .......... 370/331; 455/456.1–456.5
See application file for complete search history.

(56) References Cited

U.S. PATENT DOCUMENTS

| | | | |
|---|---|---|---|
| 6,950,664 B2 * | 9/2005 | Chen et al. | 455/456.5 |
| 7,881,263 B1 * | 2/2011 | Vargantwar et al. | 370/331 |
| 2004/0067759 A1 * | 4/2004 | Spirito et al. | 455/456.1 |
| 2008/0293435 A1 * | 11/2008 | Maher et al. | 455/456.2 |

* cited by examiner

*Primary Examiner* — Albert T Chou (57) ABSTRACT

A method for selecting a wireless coverage sector to serve a mobile station, such as in response to a handoff request that designates a sector-identifier that represents two or more possible sectors. A serving radio access network (RAN) may identify potential sectors in the region and may then select the sector whose azimuth is closest to the geographic bearing of the mobile station from the sector's base station. Further, in the event of a tie between two or more sectors or in other circumstances, the RAN may also take into consideration how close the mobile station is to various base stations, such as selecting the sector to whose base station the mobile station is closest. In a system that uses neighbor lists to govern handoff, the invention can help to facilitate handoff in a scenario where a mobile station requests handoff to a sector not listed in the mobile station's neighbor list.

18 Claims, 7 Drawing Sheets

METHOD FOR USE OF AZIMUTH AND BEARING DATA TO SELECT A SERVING SECTOR FOR A MOBILE STATION

REFERENCE TO RELATED APPLICATION

This is a continuation of U.S. patent application Ser. No. 11/831,373, filed Jul. 31, 2007, the entirety of which is hereby incorporated by reference.

FIELD OF THE INVENTION

The present invention relates to wireless communications and, more particularly, to determination of which sector in a cellular network should serve a mobile station.

BACKGROUND

Cellular wireless is an increasingly popular means of personal communication in the modern world. People are using cellular wireless networks for the exchange of voice and data over cellular telephones, Personal Digital Assistants ("PDAs"), cellular modems, and other devices. In principle, a user can seek information over the Internet or call anyone over a Public Switched Telephone Network ("PSTN") from any place inside the coverage area of the cellular wireless network.

In a typical cellular wireless system, an area is divided geographically into a number of cell sites provided by a radio access network (RAN). The RAN typically comprises one or more base transceiver stations (BTSs), each of which has one or more antennas that radiate to define a radio frequency (RF) radiation pattern. The BTS(s) of the RAN may then be coupled with a base station controller (BSC) or radio network controller (RNC), which may in turn be coupled with a telecommunications switch or gateway, such as a mobile switching center (MSC) or packet data serving node (PDSN) for instance. The switch or gateway may then provide connectivity with a transport network, such as the public switched telephone network (PSTN) or the Internet for instance.

When a mobile station (such as a cellular telephone, a wirelessly equipped PDA or personal computer, or another suitably equipped device) is positioned in a cell, the mobile station communicates via an RF air interface with the BTS of the cell. Consequently, a communication can be established between the mobile station and another entity, via the air interface and the RAN.

With the explosive growth in demand for wireless communications, the level of call traffic in most cell sites has increased drastically over recent years. To help manage the call traffic, most cells in a wireless network are usually further divided geographically into a number of sectors (which can be visualized ideally as pie pieces), each defined respectively by radiation patterns from directional antenna components of the respective BTS, or by respective BTS antennae. As such, each sector has an azimuth, which is understood to be the general direction of radiation of the sector, such as the direction the antenna of the sector is pointing.

In a Code Division Multiple Access (CDMA) wireless network and perhaps in other types of networks, each cell employs one or more carrier frequencies, and each sector is distinguished from adjacent sectors by a pseudo-random number offset (PN offset). Further, each sector may concurrently communicate on multiple different channels, distinguished by "Walsh codes". When a mobile station operates in a given sector, communications between the mobile station and the BTS of the sector are carried on a given frequency and are encoded by the sector's PN offset and, perhaps, a given Walsh code.

According to well known industry standards, a mobile station can communicate with a number of "active" sectors at a time. Depending on the system, the number of active sectors may be up to three or six, for instance. The mobile station receives largely the same signal from each of the active sectors and, on a frame-by-frame basis, may select the best signal to use.

A mobile station maintains in its memory a list of the sectors in its "active" set. In addition, it maintains in its memory a list of "candidate" sectors (e.g., up to six), which are those sectors that are not yet in the active set but that have sufficient signal strength that the mobile station could demodulate signals from those sectors. Further, the mobile station maintains a list of "neighbor" sectors, which are those sectors not in the active set or candidate set but are in close vicinity to the mobile station. All other possible sectors are members of a "remaining" set.

In existing systems, to facilitate a determination of which sectors should be in the mobile station's active set, all base stations emit a pilot channel signal on each sector, typically at a power level higher than other downlink signals. A mobile station then constantly measures the strength ($E_c/I_o$, i.e., energy versus spectral density) of each pilot that it receives and notifies the RAN (e.g., a BSC serving the mobile station) when pilot strength falls above or below designated thresholds. The RAN, in turn, provides the mobile station with an updated list of active pilots.

In one arrangement, for instance, the RAN may initially transmit to the mobile station (e.g., over a downlink control channel or traffic channel) a Handoff Direction Message (HDM), containing parameters such as (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds) Additionally, the RAN may initially provide the mobile station with a Neighbor List Update Message (NLUM), which identifies the "neighbor" sectors for the current active set.

The mobile station may then monitor all of the pilot signals that it receives, and the mobile station may determine if any neighbor pilot exceeds T_ADD by T_COMP. If so, the mobile station may add the pilot to its "candidate" set and send a Pilot Strength Measurement Message (PSMM) to the base station, indicating the estimated $E_c/I_o$ for the pilot, with the pilot designated by PN offset. Depending on current capacity and other issues, the RAN may then agree to allow the mobile station to hand off to the designated sector. Accordingly, the RAN may reserve a channel resource (such as a Walsh code) in the sector and may send to the mobile station an HDM listing the pilot as a new member of the mobile station's active set and directing the mobile station to use the reserved channel resource in the added sector. Further, the RAN may send to the mobile station a new NLUM, designating a new neighbor list corresponding to the mobile station's revised active set.

Upon receipt of the HDM, the mobile station would then add the pilot to its active set as instructed, and the mobile station would send a Handoff Completion Message (HCM) to the RAN, acknowledging the instruction, and providing a list of the pilots (PN offsets) in its active set, thereby completing the handoff.

Similarly, if the mobile station detects that the signal strength of a pilot in its active set drops below T_DROP, the mobile station may start a handoff drop timer. If T_TDROP passes, the mobile station may then send a PSMM to the RAN, indicating the $E_c/I_o$ and drop timer, and similarly designating the pilot by PN offset. The RAN may then respond by sending an HDM to the mobile station, without the pilot in the active set. And the mobile station may then receive the HDM and responsively move the pilot to its neighbor set and send an HCM to the RAN. Further, the base station may likewise send a new NLUM to the mobile station to update the mobile station's neighbor list.

To facilitate handoff of a mobile station from one sector to another, nearby sectors of a cellular system should have distinct identifiers that the mobile station and RAN can reference when engaging in handoff signaling. In a CDMA system, for instance, nearby sectors have distinct PN offsets, and the PSMM, HDM, and HCM signals reference to those PN offsets. In other types of cellular systems, other types of sector identifiers may be used.

Provided with such distinct sector-identifiers, when a mobile station requests handoff to a sector designated by a particular identifier, the RAN can readily determine which sector the mobile station means, and if appropriate the RAN can reserve resources in that sector and direct the mobile station to hand off to the sector. Accordingly, it is generally important that all of the sectors to which a mobile station can hand off from the current serving sector(s) have different identifiers from each other.

If two or more sectors were to have the same identifier as each other and are near enough to each other, the identifier could give rise to ambiguity. In particular, if a mobile station detects a strong pilot from one such sector and requests handoff by reference to the sector identifier, the RAN would not know which sector the mobile station means. In a worst case, the RAN could assume the mobile station means a particular one of the sectors and could reserve resources in that sector, but the pilot actually received by the mobile station could have been in another sector altogether. In that case, when the RAN grants the mobile station's handoff request, the mobile station may be unable to communicate on the sector, and the mobile station may experience a dropped call, which could result in a poor user experience.

On the other hand, cellular systems are typically designed to re-use sector identifiers or other parameters for sectors that are deemed to be located far enough apart from each other that such ambiguity would not arise. One reason to re-use sector identifiers in this manner is to conserve a potentially limited supply of sector identifier values. For instance, a CDMA system typically uses a limited number of PN offsets, so that mobile stations will only have to scan the airwaves for those particular PN offsets. Consequently, in a typical CDMA system, sectors that are deemed to be located far enough apart from each other may have the same PN offset as each other, while sectors that are located closed to each other should not have the same PN offset as each other.

Considering this ambiguity problem, a CDMA RAN is also typically arranged to allow a mobile station to hand off only to sectors that are listed in the mobile station's current neighbor list, since those sectors are assumed to be close enough to the mobile station's current serving sector(s), and since, by design, those sectors would not have the same identifiers as each other. In practice, a mobile station may detect a strong pilot from a sector not in the mobile station's neighbor list, and the mobile station may report it to the RAN. However, upon receipt of such a request, a CDMA RAN would not direct a handoff to the indicated sector, because the sector is not a member of the mobile station's current neighbor list. Rather, the RAN may simply record the pilot measurement for later engineering analysis or for other purposes.

SUMMARY

Unfortunately, however, a strict prohibition on handoff to sectors that are not in a mobile station's neighbor list (or the like) can itself be a problem. Through engineering error or for other reasons, such as recent changes in topography, etc., it is possible that a mobile station's neighbor list would not include a sector that is actually the strongest or only sector available to serve the mobile station. If the RAN precludes handoff to such a sector, and if the mobile station loses contact with the mobile station's current serving sector(s), the mobile station may experience a dropped call, which again could result in poor user experience. Therefore, an improvement is desired.

The present invention provides such an improvement, applicable in a scenario where it is unclear which of two of more sectors should serve a mobile station. As such, the invention may apply when a mobile station requests handoff by reference to a sector-identifier or other parameter that could equally represent two or more sectors. In that case, the RAN would need to determine which of the sectors is or should be the handoff target for the mobile station, so that the RAN can then facilitate handoff to that sector. Alternatively, the invention may apply in any other scenario where a RAN needs to determine which of two or more sectors should serve a mobile station.

If the invention is applied in a CDMA system or other system that uses neighbor lists or the like, the ambiguous sector-identifier (or other parameter) may be an identifier that is not currently included in the mobile station's neighbor list. Under normal CDMA procedures as described above, the RAN would thus not permit handoff to the sector. In accordance with the invention, however, the RAN will instead apply a process to intelligently determine which of the two of more sectors is the intended handoff target, and the RAN may then safely reserve resources in that sector and direct the mobile station to hand off to that sector.

As presently contemplated, in order to determine which of the two or more sectors is the intended handoff target for the mobile station, the RAN will compare the azimuths of the sectors with the geographic bearings of the mobile station from the base stations defining the sectors, to determine which sector is directed most toward the mobile station's location. By way of example, for each sector represented by the ambiguous sector-identifier or other parameter, the RAN may compute an angular difference between (i) the azimuth of the sector and (ii) the geographic bearing of the mobile station from the sector's base station. The RAN may then select as the target sector the sector having the smallest angular difference, as that sector is directed most toward the mobile station.

The RAN may also take into consideration other factors when deciding which sector should serve the mobile station. For instance, the RAN may take into consideration which of the sectors' base stations is geographically closest to the mobile station's current location. By way of example, for each sector, the RAN could compute an angular difference as noted above and could also compute a distance between the sector's base station and the mobile station's location. The RAN could then score each sector by applying a function that weighs the sector's angular difference and the sector's distance (e.g., a certain multiple of the angular difference plus a certain multiple of the linear distance), and the RAN could select the sector having the lowest score. As another example, the RAN could simply consider angular difference as noted above, and in the event of a tie between two or more sectors, could then select the one of those sectors whose base station is closest to the mobile station. Still further, the RAN could take into consideration additional factors, such as topography and other obstructions in the RF environment for instance.

These as well as other aspects and advantages will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

DETAILED DESCRIPTION

Figure 1:
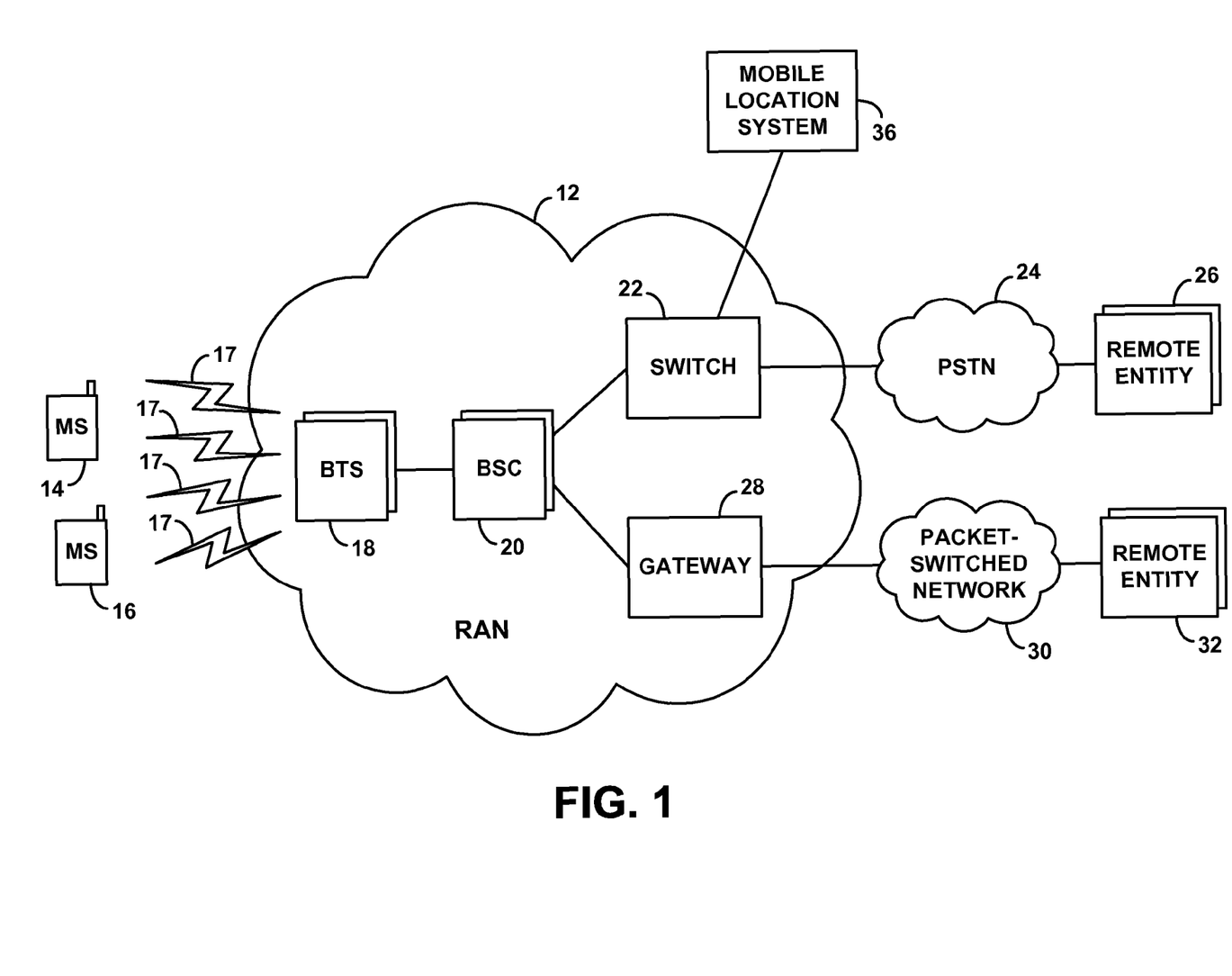
FIG. 1 is a simplified block diagram of a communication system in which an exemplary embodiment of the invention can be implemented.

Referring to the drawings, FIG. 1 depicts a cellular communication system in which aspects of the exemplary embodiment can be applied. It should be understood, however, that this and other arrangements and functions described herein are presented for purposes of example only, and that numerous variations are possible. For instance, elements can be added, omitted, combined, distributed, reordered, or otherwise modified. Further, where this document mentions functions that can be carried out by one or more devices, systems, or other entities, it should be understood that the functions may be implemented by software (e.g., machine language instructions stored in data storage and executed by a processor), firmware, and/or hardware.

As shown in FIG. 1, the example communication system includes at its core a RAN 12 that is arranged to provide multiple mobile stations with wireless communication service. FIG. 1 depicts two representative mobile stations 14, 16 by way of example, either or each of which could be a cell phone, wirelessly equipped PDA, or other type of wirelessly-equipped device now known or later developed. Each mobile station is equipped with hardware, software, and/or other logic to communicate with RAN 12 in a known manner in accordance with an agreed communication protocol, such as CDMA (e.g., IS-95, IS-2000, 1xRTT, 1xEV-DO, etc.), iDEN, WiMAX, TDMA, AMPS, GSM, GPRS, UMTS, EDGE, or any other communication protocol now known or later developed.

RAN 12 defines a plurality of sectors (i.e., any wireless coverage areas established by reference to base station emissions or the like) in which mobile stations can communicate with the RAN. In particular FIG. 1 shows the RAN radiating to define four example sectors 17. The RAN may define these sectors discretely through use of directional antennas and/or by various modulation parameters, including, without limitation, carrier frequencies and PN offsets or other parameters, depending on the air interface protocol used.

The RAN can take various forms and may include any of a variety and number of components, depending for instance on the air interface protocol employed by the RAN. For example, the RAN may include one or more base transceiver stations (BTSs) 18 and one or more base station controllers (BSCs) 20 (also sometimes referred to as radio network controllers (RNCs)). The BTSs preferably include directional antennas, power amplifiers, and associated transceiver equipment arranged to establish the sectors shown and to communicate with served mobile stations.

In turn, each BSC 20 may control one or more BTSs and may manage aspects of air interface operation. For instance, a BSC may manage assignment of air interface traffic channels to mobile stations in response to mobile station origination messages. Further, the BSC may manage handoff of mobile stations between sectors, by engaging in control channel signaling such as that described above.

For instance, the BSC may first transmit to the mobile station a neighbor list for a sector initially selected sector upon call origination. The BSC may then receive PSMMs from the mobile station, reporting on pilot signal strengths detected by the mobile station, and the BSC may send HDMs to the mobile station, directing the mobile station to add or remove particular sectors from the mobile station's active set, i.e., to hand off from one sector to another as described above. In addition, each time the mobile station's active set changes, the BSC may provide the mobile station with a new neighbor list corresponding with the members of the mobile station's active set.

Each BSC may be coupled with a mobile switching center (MSC) or other switch 22 that provides connectivity with the public switched telephone network (PSTN) 24 if applicable, so that served mobile stations can communicate with remote entities 28 on the PTSN. And each BSC may be coupled with a packet data serving node (PDSN) or other gateway 30 that provides connectivity with a packet-switched network 32 if applicable, so that served mobile stations can communicate with remote entities 34 on the packet-switched network.

The example communication system of FIG. 1 also includes a mobile positioning system that facilitates determination of the location of mobile stations in accordance with well known principles. As shown in FIG. 1, for instance, a mobile location system (MLS) 36 can be linked with MSC 22 or another RAN element via a signaling network and/or via a general packet-data network. The MLS 36 may function as a location server, able to maintain records of mobile station location and to report mobile station locations to querying entities. The MLS may determine the location of a mobile station through interaction with position determining equipment (not shown), which may be network-based (e.g., triangulation mechanisms) or handset-based (e.g., GPS-based).

For high precision location determination, the MLS 36 may engage in signaling with the mobile station itself, according to well known industry standard IS-801 for example. In that process, the mobile station may report cellular signal measurements to the MLS, the MLS may use those measurements to determine roughly where the mobile station is located, and the MLS may then provide the mobile station with appropriate satellite assistance data to enable the mobile station to tune to particular satellites in its area. Based on signals that the mobile station then receives from those satellites, the mobile station or the MLS may then compute the mobile station's location with a high degree of accuracy. And the MLS may report that determined location to a querying entity. By the same token, some other entity (such as a RAN entity) may directly request the mobile station to report the mobile station's GPS-determined location, and the mobile station may compute its location by reference to satellite signals and then return its reported location to the querying entity.

Figure 2:
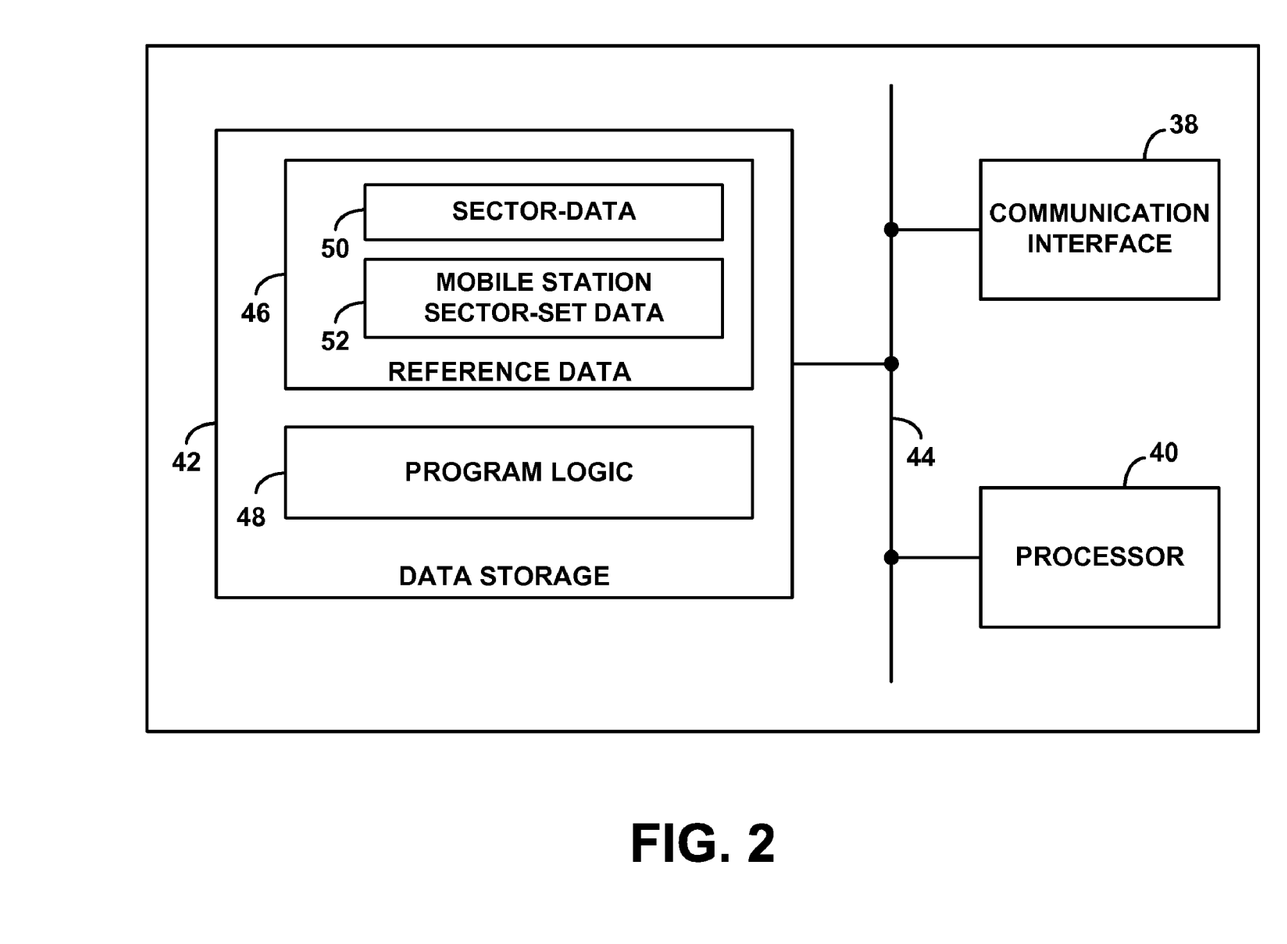
FIG. 2 is a simplified block diagram of an entity arranged to implement aspects of the exemplary embodiment.

Aspects of the present invention may be carried out by one or more entities shown in FIG. 1, or by one or more other entities. For instance, aspects may be carried out by BTS 18, BSC 20, by switch 22, and/or by some other entity (such as a controlling server (not shown) coupled with the various entities shown). FIG. 2 is a simplified block diagram depicting functional components of such an entity (e.g., combination of entities). As shown, the entity includes by way of example a communication interface 38, a processor 40, and data storage 42, coupled together by a system bus, network, or other connection mechanism 44.

Communication interface 38 may include one or more communication interface mechanisms that enable the entity to communicate with various other entities. As such, the communication interface may take various well known forms, depending factors such as the type of communication links in use. Processor 40 may comprise one or more general purpose processors (e.g., INTEL processors) and/or one or more specialized processors (e.g., digital signal processors and/or application specific integrated circuits). And data storage 42 may comprise one or more volatile and/or non-volatile storage components, such as optical, magnetic, or organic storage components and may integrated in whole or in part with processor 40.

As shown, data storage 42 may hold reference data 46 and program logic 48. The reference data may comprise sector-data 50 and mobile station sector-set data 52.

The sector-data 50 preferably identifies various sectors in the region. For each sector, as an example, the sector-data may specify at least (i) a geographic location (e.g., latitude/longitude coordinates) of the base station defining the sector, (ii) an azimuth of the sector, referenced to due north or another defined reference direction, (iii) a PN offset and/or other parameter used to identify the sector, and (iv) the PN offset and/or other identifier of each sector that is considered a neighbor of the sector. This sector-data 50 can be established by engineering design when a base station is put in place or is adjusted.

In addition, the sector-data 50 may include a record of how loaded each sector currently is, such as what portion of the sector's resources (e.g., traffic channels, timeslots, etc.) are currently in use. The RAN (e.g., BSC) may establish this load data dynamically as usage changes over time. Further, the RAN may use this load data, among possibly other data, as a basis to determine whether to admit (e.g., hand off) a mobile station to a given sector, such as by allowing a handoff to a sector only if the sector does not have a threshold load.

The mobile station sector-set data 52, in turn, comprises data for each mobile station that is currently being served by the RAN, and indicates for each such mobile station one or more sectors in which the mobile station is currently operating or with which the mobile station is otherwise currently associated. In a CDMA system or the like for instance, the sector-set data 52 may define each mobile station's current active set. Through PSMM and HDM messaging, a mobile station's active set may be established and updated, and the RAN may correspondingly update the sector-set data 52, so that the RAN always has a record of the mobile station's current active set. Furthermore, when necessary, the RAN may determine the neighbor list for a given mobile station, by considering the mobile station's active set and the neighboring-sector information in the sector-data 50.

The program logic 48 may comprise machine language instructions executable by processor 40 to carry out various functions described herein. For example, the program logic 48 may be executable to receive from a mobile station a handoff request (e.g., a PSMM) that designates a sector by an ambiguous identifier, i.e., an identifier that represents more than one sector. Further, the program logic 48 may then be executable in accordance with the exemplary process to responsively determine which of the sectors the mobile station means, i.e., which sector should be a handoff target for the mobile station, and to then approve, invoke, or otherwise facilitate a handoff to that sector.

Figure 3:
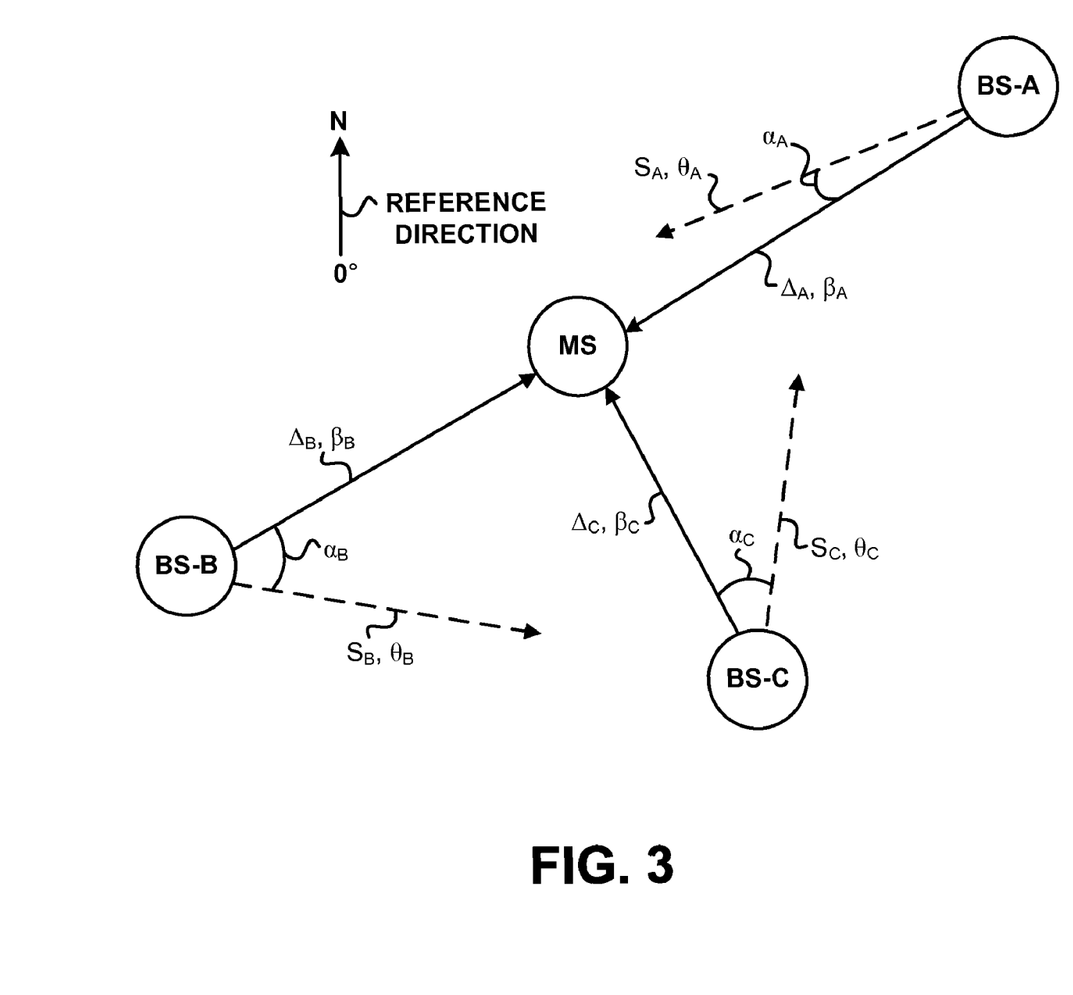
FIG. 3 is an illustration of example base stations and an example mobile station, depicting angular differences and distances that can be considered in accordance with the exemplary embodiment.

FIG. 3 depicts an example arrangement of base stations and a mobile station, to help explain how the inventive process can operate in practice. The figure shows three example base stations (e.g., BTS towers) A, B, C, each having a respective geographic location and each radiating to define a sector S in a direction represented by a dashed vector having an angle θ from a reference direction (e.g., due north). In particular, base station A radiates in a direction $\theta_A$ to define a sector $S_A$, base station B radiates in a direction $\theta_B$ to define a sector $S_B$, and base station C radiates in a direction $\theta_C$ to define a sector $S_C$. (As is well understood in the art, the typical radiation pattern of a sector extends in a particular pattern defined by the azimuth of the sector antenna. In FIG. 3, each sector and its direction of radiation or azimuth is depicted by a simple dashed vector.)

In practice, each base station may be configured to define multiple sectors, but for simplicity only one such sector per base station is shown. The present invention addresses the problem where multiple sectors have a common identifier, such as a common PN offset. Thus, for purposes of example, assume that sectors $S_A$, $S_B$, and $S_C$ each have the same PN offset or other identifier.

FIG. 3 further depicts an example mobile station (e.g., a cell phone or other wireless communication device) positioned in a region where the three base stations are located. As shown by the solid vectors in the figure, the mobile station is located at a geographic location that is a distance Δ respectively from each base station and has an angular bearing β respectively from each base station. For this purpose, the angular bearing is taken from the same reference direction (e.g., due north) used for the sector azimuths. Thus, as shown, the mobile station is at a distance $\Delta_A$ with a bearing $\beta_A$ from base station A, the mobile station is at a distance $\Delta_B$ with a bearing $\beta_B$ from base station B, and the mobile station is at a distance $\Delta_C$ with a bearing $\beta_C$ from base station C.

In the example arrangement of FIG. 3, assume that the RAN serving the mobile station is faced with a question of which sector should serve the mobile station. This may happen, for instance, if the RAN receives from the mobile station a handoff request (e.g., PSMM) that designates a sector by an ambiguous parameter such as a PN offset that identifies multiple sectors in the region and that is not listed in the mobile station's neighbor list or the like. Alternatively, this may happen in some other scenario.

To determine which sector should serve the mobile station, the RAN may first compile a list of potential sectors in the region. For instance, if the RAN had received from the mobile station a PSMM designating a particular PN offset that was not in the mobile station's current neighbor list, the RAN may determine which sectors having that PN offset originate from base stations located within a defined threshold distance of the mobile station. To do so, the RAN may apply the location-determination techniques noted above to determine the geographic location of the mobile station, and the RAN may then reference the sector-data 50 to determine which sectors in the region have the designated PN offset and are located within a threshold distance of the mobile station's location. Assume that these sectors are those depicted in FIG. 3.

Figure 4:
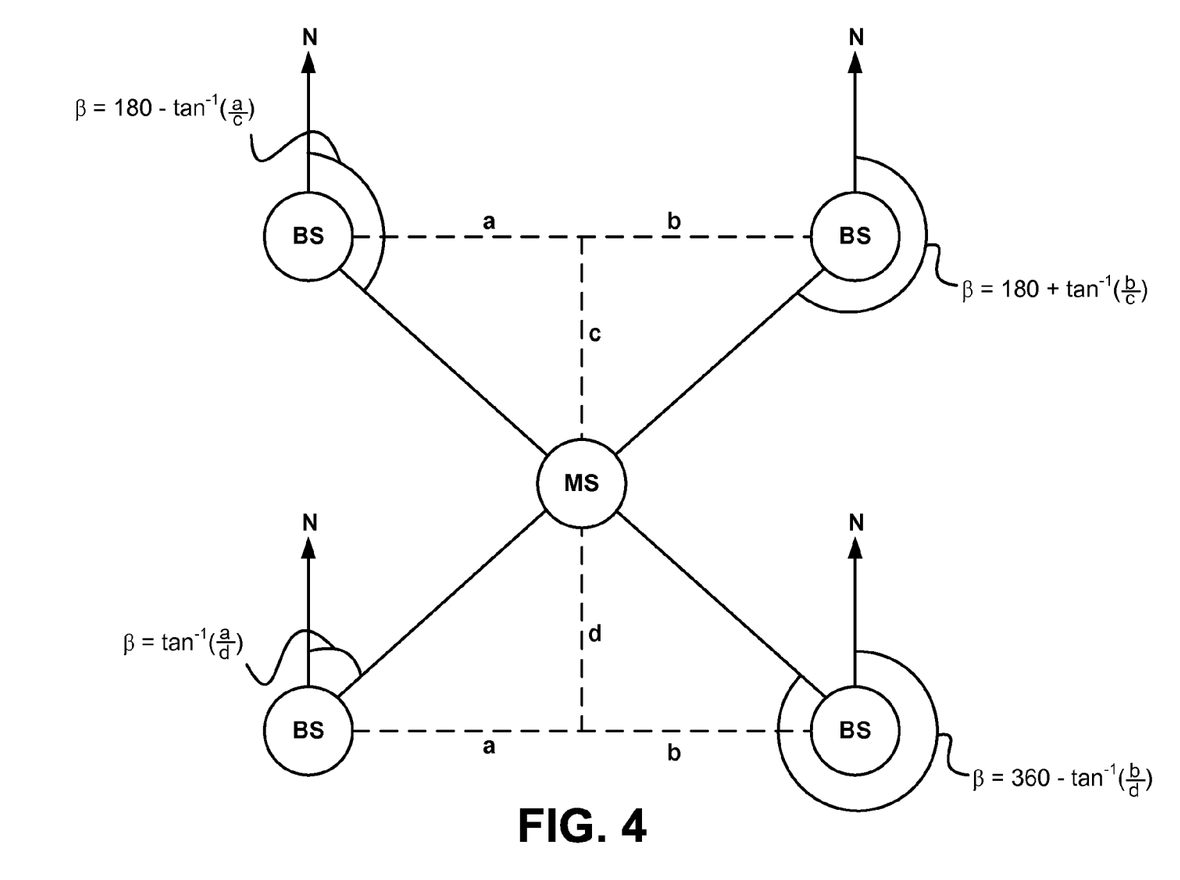
FIG. 4 is an illustration depicting geometric calculation of mobile station bearing in accordance with the exemplary embodiment.

Next, the RAN may determine for each potential sector the bearing β of the mobile station from the base station defining the sector. FIG. 4 depicts one of many examples of how the RAN may do this in practice. As shown in FIG. 4, the RAN may compute β differently depending on whether the base station is located northeast, southeast, southwest, or northwest of the mobile station. (If the base station is located due south, west, north, or east of the mobile station, the bearing is clearly 0°, 90°, 180°, or 270° respectively.) For simplicity of illustration, FIG. 4 depicts four example base stations, one located northeast of the mobile station, one located southeast of the mobile station, one located southwest of the mobile station, and one located northwest of the mobile station.

For the base station located northeast of the mobile station, the RAN may compute the bearing of the mobile station from the base station as $\beta=180+\tan^{-1}(b/c)$, where b is the absolute difference between the longitude of the mobile station and the longitude of the base station, and c is the absolute difference between the latitude of the mobile station and the latitude of the base station. For the base station located southeast of the mobile station, the RAN may compute the bearing of the mobile station from the base station as $\beta=360-\tan^{-1}(b/d)$, where b is the absolute difference between the longitude of the mobile station and the longitude of the base station, and d is the absolute difference between the latitude of the mobile station and the latitude of the base station.

For the base station located southwest of the mobile station, the RAN may compute the bearing of the mobile station from the base station as $\beta=\tan^{-1}(a/d)$, where a is the absolute difference between the longitude of the mobile station and the longitude of the base station, and d is the absolute difference between the latitude of the mobile station and the latitude of the base station. And for the base station located northwest of the mobile station, the RAN may compute the bearing of the mobile station from the base station as $\beta=180-\tan^{-1}(a/c)$, where a is the absolute difference between the longitude of the mobile station and the longitude of the base station, and c is the absolute difference between the latitude of the mobile station and the latitude of the base station.

Returning to FIG. 3, given the bearing of the mobile station from each potential sector's base station, the RAN may then compute for each sector the angular difference a between the azimuth of the sector and the bearing of the mobile station from the sectors' base station. In turn, the RAN may then determine which sector has the smallest computed angular difference α. In the arrangement of FIG. 3, the RAN would determine that sector $S_A$ has the smallest angular difference α. Based on that determination, the RAN may select sector $S_A$ as the sector that should serve the mobile station, as sector A is the sector most closely directed at the mobile station's location. In response to a PSMM from the mobile station, the RAN may then use the sector-data to determine whether to allow a handoff to sector $S_A$ and, if so, the RAN may then reserve channel resources in sector $S_A$ and send an HDM to the mobile station directing the mobile station to hand off to sector $S_A$.

Furthermore, in addition to considering the angular difference α for each sector, the RAN may consider for some or all of the sectors the distance Δ between the mobile station and the base station defining the sector. The RAN may take distance into account when faced with a tie of angular difference α (within any defined range) between two or more sectors, or the RAN may take distance into account in any event, in the manner described above for instance. In practice, the RAN may compute the distance Δ for a given sector by applying Pythagorean's theorem, given the latitude/longitude coordinates of the mobile station and the sector's base station. If the RAN has determined that two or more sectors have the smallest angular difference of all the potential sectors, the RAN may then select as the serving sector the sector of those two or more that has the smallest distance Δ.

Figure 5:
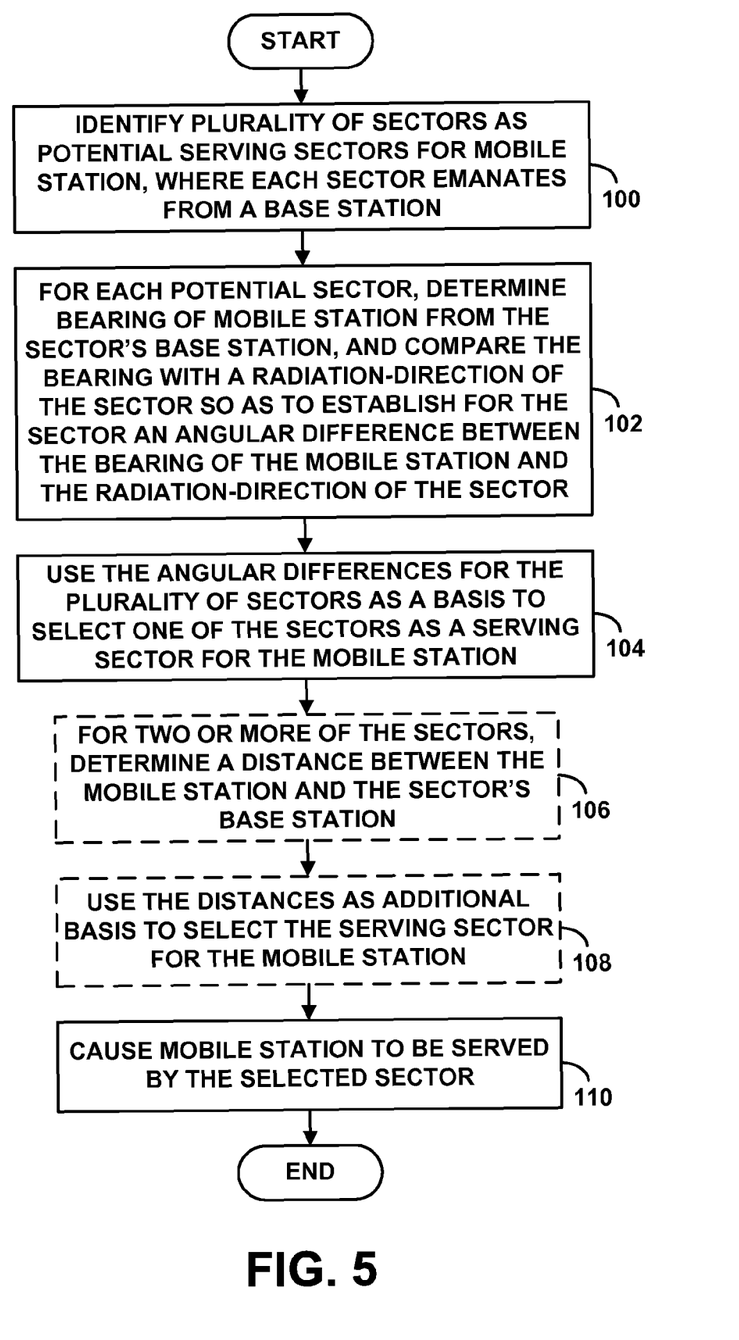
FIG. 5 is a flow chart depicting a method in accordance with the exemplary embodiment.

Referring next to FIG. 5, a flow chart is provided to summarize a method that can be carried out by a RAN (e.g., a BSC or other entity as depicted in FIG. 2) in accordance with the exemplary embodiment, to select a sector to serve a mobile station. As shown in FIG. 5, at block 100, the method involves identifying a plurality of sectors as potential serving sectors for the mobile station, where each sector emanates from a base station. At step 102, the method then involves, for each potential serving sector, using a geographic location of the mobile station and a geographic location of the sector's base station as a basis to determine a bearing of the mobile station from the sector's base station, and comparing the determined bearing with a radiation-direction of the sector so as to establish for the sector an angular difference between the bearing of the mobile station and the radiation-direction of the sector. At step 104, the method then involves using the established angular differences for the plurality of sectors as a basis to select one of the sectors as a serving sector for the mobile station.

At step 106, shown in dashed lines, the method may further involve, for some or all of the potential sectors, using the geographic location of the mobile station and the geographic location of the sector's base station as a basis to determine a distance between the mobile station and the sector's base station. In turn, at step 108, also shown in dashed lines, the method may involve using the established distances as a further basis to select one of the sectors as the serving sector for the mobile station.

Upon determining which sector should serve the mobile station, the method of FIG. 5 then involves, at step 110, causing the mobile station to be served by the selected sector. As described above, this function may involve sending an HDM to the mobile station to direct a handoff to the sector. Alternatively, this function may take other forms.

Figure 6:
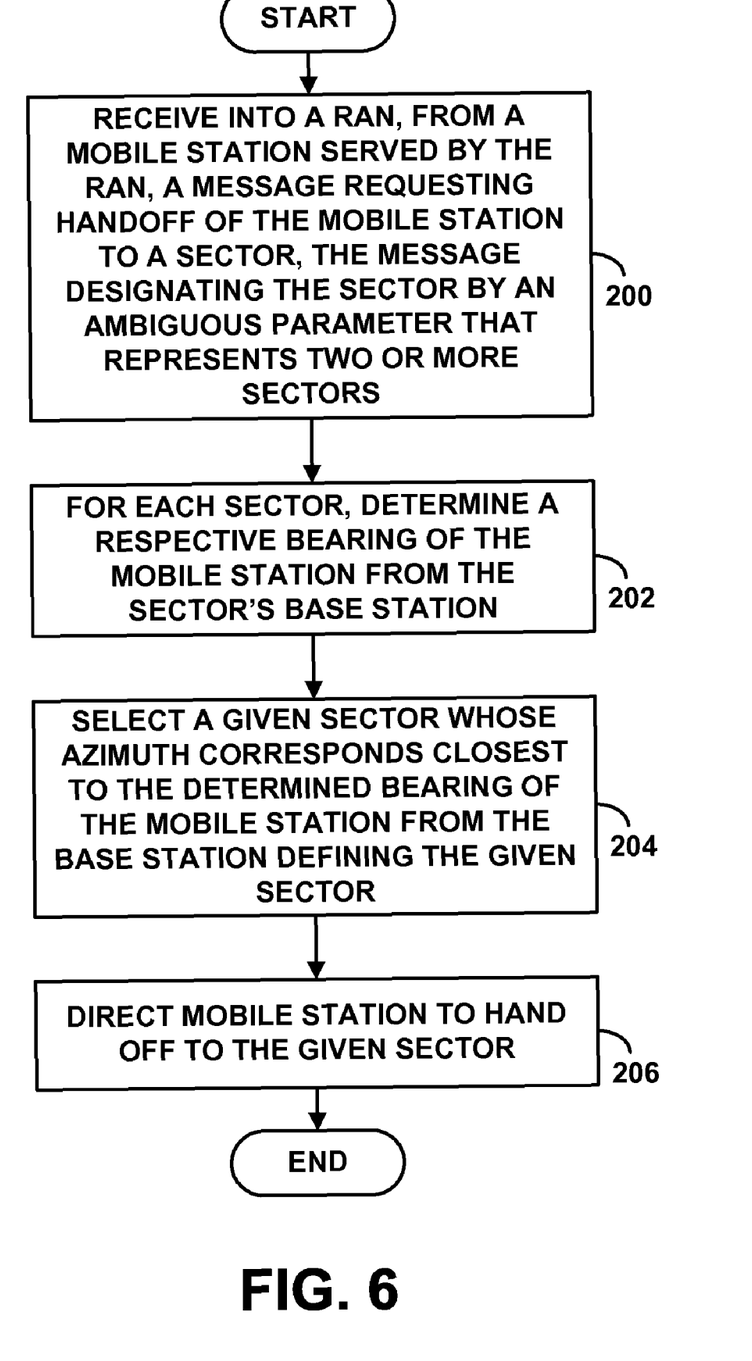
FIG. 6 is another flow chart depicting a method in accordance with the exemplary embodiment.

FIG. 6 is a flow chart depicting another method arranged in accordance with the exemplary embodiment, to facilitate handoff of a mobile station. As shown in FIG. 6, at block 200, the method involves receiving into a RAN, from a mobile station served by the RAN, a message requesting handoff of the mobile station to a sector, wherein the message designates the sector by an ambiguous parameter that represents two or more sectors each defined by a respective base station and having an azimuth from the respective base station.

In response, at step 202, the method then involves, for each sector, comparing a geographic location of the mobile station with a geographic location of the base station defining the sector, to determine a respective bearing of the mobile station from the base station defining the sector. In turn, at step 204, the method involves selecting a given sector whose azimuth corresponds closest to the determined bearing of the mobile station from the base station defining the given sector. (Further, as noted above, in the event of a tie between two or more sectors, the method may involve selecting as the given sector the sector whose base station is located closest to the mobile station.) And at step 206, the method involves sending to the mobile station a directive for the mobile station to hand off to the given sector.

In the method of FIG. 6, the handoff request message could be a PSMM transmitted via an air interface, and the ambiguous parameter could be a PN-offset that is not contained in a neighbor list of the mobile station at the time the RAN receives the handoff request message. Thus, the RAN could determine that the PN offset is not in the mobile station's neighbor list and could responsively invoke the remaining functions of the process. In turn, the directive for the mobile station to hand off to the given sector could be an HDM transmitted via the air interface, designating a Walsh code and/or other resource that the RAN reserves for use by the mobile station in the given sector.

Further, the act of comparing a geographic location of the mobile station with a geographic location of the base station defining the sector, to determine a respective bearing of the mobile station from the base station defining the sector may involve comparing latitude and longitude of the mobile station with latitude and longitude of the base station defining the sector to determine as the bearing a compass bearing of the mobile station from the base station defining the sector.

In turn, the act of selecting the sector whose azimuth corresponds closest to the determined bearing of the mobile station from the base station defining the given sector could involve, (i) for each sector, determining the compass direction (e.g., north, northeast, east, southeast, south, southwest, west, or northwest) to which the determined bearing is closest, and (ii) selecting the sector whose azimuth is closest to that compass direction.

Thus, if the bearing is closest to north, the method may involve selecting the sector whose azimuth is closest to 0 degrees from north; if the bearing is closest to northeast, the method may involve selecting the sector whose azimuth is closes to 45 degrees from north; if the bearing is closest to east, the method may involve selecting the sector whose azimuth is closes to 90 degrees from north; if the bearing is closest to southeast, the method may involve selecting the sector whose azimuth is closes to 135 degrees from north; if the bearing is closest to south, the method may involve selecting the sector whose azimuth is closes to 180 degrees from north; if the bearing is closest to southwest, the method may involve selecting the sector whose azimuth is closes to 225 degrees from north; if the bearing is closest to west, the method may involve selecting the sector whose azimuth is closes to 270 degrees from north; and if the bearing is closest to northwest, the method may involve selecting the sector whose azimuth is closes to 315 degrees from north.

Figure 7:
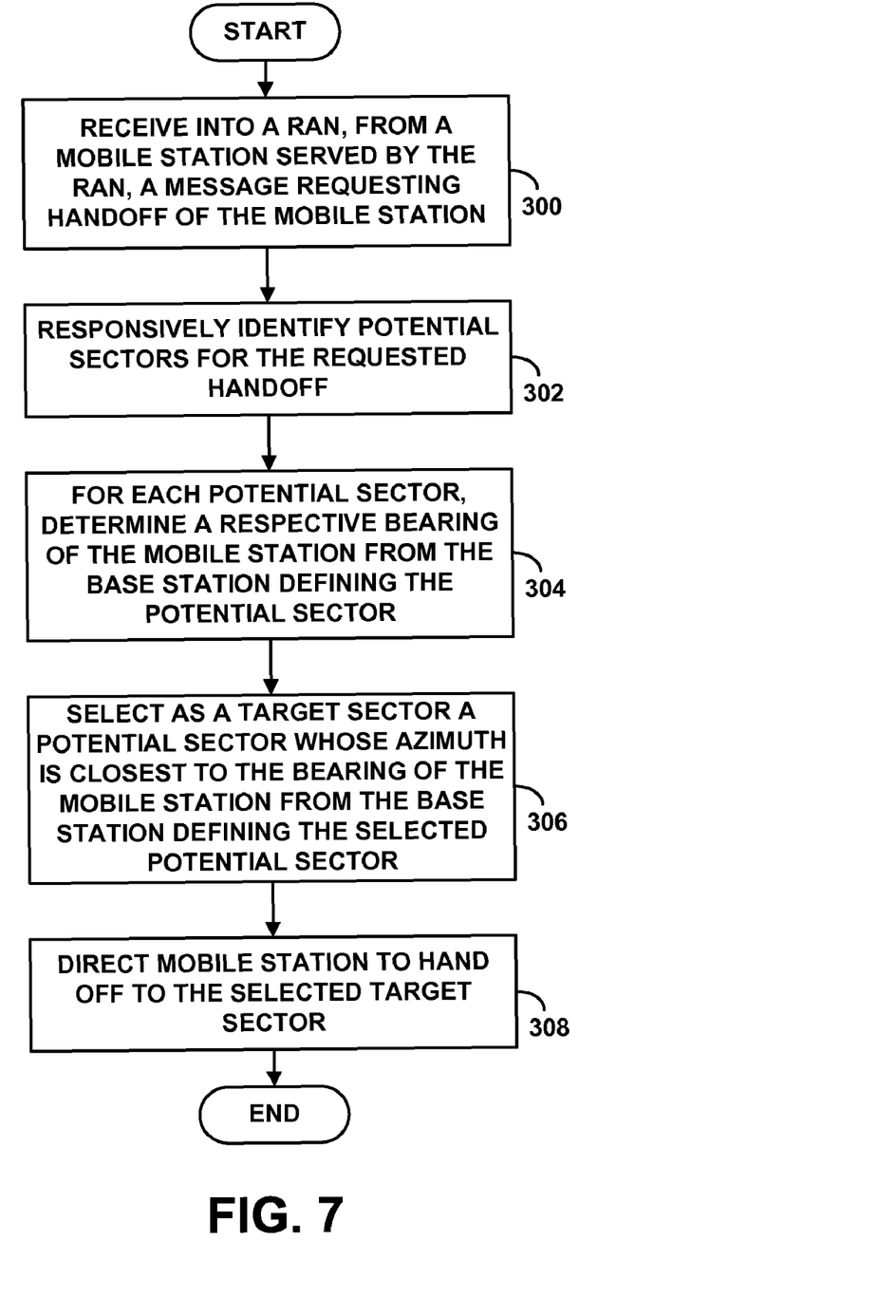
FIG. 7 is yet another flow chart depicting a method in accordance with the exemplary embodiment.

FIG. 7 is next a flow chart depicting yet another method arranged in accordance with the exemplary embodiment, to facilitate handoff of a mobile station. As shown in FIG. 7, at block 300, the method involves receiving into a RAN, from a mobile station served by the RAN, a message requesting handoff of the mobile station. The handoff request may or may not carry an ambiguous parameter that represents two or more sectors. For instance, the handoff request may be a PSMM or the like, carrying a PN-offset that is not contained in a neighbor list of the mobile station (if applicable) at the time the RAN receives the handoff request and that is used in two or more sectors in the region.

At step 302, the method then involves responsively identifying a plurality of potential sectors for the requested handoff, where each potential sector has a respective azimuth from a base station (e.g., a base station in the RAN, or a distributed antenna system remote antenna unit that functions as a surrogate base station) defining the sector. For instance, the RAN may refer to stored data (such as sector-data 50 described above) to determine which of various sectors in the region are represented by the ambiguous parameter.

In turn, at step 304, the method then involves, for each potential sector, comparing a geographic location of the mobile station with a geographic location the base station defining the potential sector, to determine a respective bearing of the mobile station from the base station defining the potential sector. And at step 306, the method then involves selecting as a target sector a potential sector whose azimuth is closest to the bearing of the mobile station from the base station defining the selected potential sector. (Further, as noted above, in the event of a tie between two or more sectors, the RAN may select as the target sector the sector whose base station is located closest to the mobile station.) Finally, at step 308, the method involves directing the mobile station to hand off to the selected target sector. For instance, the method may involve reserving at least one resource (e.g., a Walsh code) in the selected target sector, and sending an HDM or the like to the mobile station, directing the mobile station to hand off to the selected target sector and to use the at least one reserved resource.

As in the method described above, the act of comparing a geographic location of the mobile station with a geographic location the base station defining the potential sector, to determine a respective bearing of the mobile station from the base station defining the potential sector may involve comparing a latitude and longitude of the mobile station with a latitude and longitude of the base station defining the potential sector to determine as the bearing a compass bearing of the mobile station from the base station defining the potential sector. In turn, also as described above, the act of selecting the target sector may involve selecting the sector whose azimuth is closest to the compass direction to which the determined bearing is closest.

An exemplary embodiment of the invention has been described above. Those of ordinary skill in the art will appreciate, however, that modifications may be made while remaining within the scope of the invention as defined by the claims.

We claim:

1. A method comprising:

receiving into a radio access network a message from a mobile station seeking to be served by a sector of the radio access network, the message designating the sector by an ambiguous parameter that represents two or more sectors each defined by a respective base station and having an azimuth from the respective base station; and responsively (i) for each sector of the two or more sectors, the radio access network comparing a geographic location of the mobile station with a geographic location of the base station defining the sector, to determine a respective bearing of the mobile station from the base station defining the sector, (ii) selecting a given sector whose azimuth corresponds closest to the determined bearing of the mobile station from the base station defining the given sector, and (iii) sending to the mobile station a directive for the mobile station to be served by the given sector.

2. The method of claim 1, wherein
comparing a geographic location of the mobile station with a geographic location of the base station defining the sector, to determine a respective bearing of the mobile station from the base station defining the sector comprises:
comparing latitude and longitude of the mobile station with latitude and longitude of the base station defining the sector to determine as the bearing a compass bearing of the mobile station from the base station defining the sector.

3. The method of claim 2, wherein selecting the given sector whose azimuth corresponds closest to the determined bearing of the mobile station from the base station defining the given sector comprises:
if the compass bearing is closest to north, selecting as the given sector a sector whose azimuth is closest to 0 degrees from north;
if the compass bearing is closest to northeast, selecting as the given sector a sector whose azimuth is closest to 45 degrees from north;
if the compass bearing is closest to east, selecting as the given sector a sector whose azimuth is closest to 90 degrees from north;
if the compass bearing is closest to southeast, selecting as the given sector a sector whose azimuth is closest to 135 degrees from north;
if the compass bearing is closest to south, selecting as the given sector a sector whose azimuth is closest to 180degrees from north;
if the compass bearing is closest to southwest, selecting as the given sector a sector whose azimuth is closest to 225 degrees from north;
if the compass bearing is closest to west, selecting as the given sector a sector whose azimuth is closest to 270 degrees from north; and
if the compass bearing is closest to northwest, selecting as the given sector a sector whose azimuth is closest to 315 degrees from north.

4. The method of claim 1, wherein the message from the mobile station comprises a Pilot Strength Management Message (PSMM), and wherein the directive to the mobile station comprises a Handoff Direction Message (HDM).

5. The method of claim 1, wherein receiving the message comprises receiving the request via an air interface between the radio access network and the mobile station, and wherein sending the directive to the mobile station comprises transmitting the directive to the mobile station via the air interface.

6. The method of claim 5, further comprising reserving at least one resource in the given sector for use by the mobile station, and wherein the directive carries an indication of the at least one reserved resource, whereby the mobile station reads the indication and uses the at least one reserved resource.

7. The method of claim 6, wherein the at least one reserved resource comprises a Walsh code.

8. The method of claim 1, further comprising:
in the event of a tie between two or more sectors, selecting as the target sector one of the two or more sectors whose base station is closest to the mobile station.

9. A method comprising:
receiving into a radio access network from a mobile station a request message that carries an ambiguous parameter that represents two or more sectors;
the radio access network responsively identifying the two or more sectors as potential sectors, each potential sector having a respective azimuth from a base station defining the sector;
for each potential sector, comparing a geographic location of the mobile station with a geographic location the base station defining the potential sector, to determine a respective bearing of the mobile station from the base station defining the potential sector;
selecting as a target sector a potential sector whose azimuth is closest to the bearing of the mobile station from the base station defining the selected potential sector; and
directing the mobile station to be served by the target sector.

10. The method of claim 9, wherein identifying the plurality of potential sectors comprises referring to stored data to identify the sectors represented by the ambiguous parameter.

11. The method of claim 10, wherein the ambiguous parameter comprises a PN-offset that is not contained in a neighbor list of the mobile station when receiving the request message from the mobile station.

12. The method of claim 9, wherein comparing a geographic location of the mobile station with a geographic location the base station defining the potential sector, to determine a respective bearing of the mobile station from the base station defining the potential sector comprises:
comparing latitude and longitude of the mobile station with latitude and longitude of the base station defining the potential sector to determine as the bearing a compass bearing of the mobile station from the base station defining the potential sector.

13. The method of claim 12, wherein selecting as the target sector the potential sector whose azimuth is closest to the bearing of the mobile station from the base station defining the selected potential sector comprises:
if the compass bearing is closest to north, selecting as the target sector a potential sector whose azimuth is closest to 0 degrees from north;
if the compass bearing is closest to northeast, selecting as the target sector a potential sector whose azimuth is closest to 45 degrees from north;
if the compass bearing is closest to east, selecting as the target sector a potential sector whose azimuth is closest to 90 degrees from north;
if the compass bearing is closest to southeast, selecting as the target sector a potential sector whose azimuth is closest to 135 degrees from north;
if the compass bearing is closest to south, selecting as the target sector a potential sector whose azimuth is closest to 180 degrees from north;
if the compass bearing is closest to southwest, selecting as the target sector a potential sector whose azimuth is closest to 225 degrees from north;
if the compass bearing is closest to west, selecting as the target sector a potential sector whose azimuth is closest to 270 degrees from north; and
if the compass bearing is closest to northwest, selecting as the target sector a potential sector whose azimuth is closest to 315 degrees from north.

14. The method of claim 9, wherein the request message comprises a Pilot Strength Management Message (PSMM), and wherein directing the mobile station to be served by the target sector comprises sending a Handoff Direction Message (HDM) to the mobile station.

15. The method of claim 9, wherein receiving the request message comprises receiving the request message via an air interface between the radio access network and the mobile station, and wherein directing the mobile station to be served by the target sector comprises transmitting to the mobile station via the air interface a directive.

16. The method of claim 15, further comprising reserving at least one resource in the target sector for use by the mobile station, and wherein the directive carries an indication of the at least one reserved resource, whereby the mobile station reads the indication and uses the at least one reserved resource.

17. The method of claim 16, wherein the at least one reserved resource comprises a Walsh code.

18. The method of claim 9, further comprising:
in the event of a tie between two or more potential sectors, selecting as the target sector one of the two or more potential sectors whose base station is closest to the mobile station.

* * * * *